Patented June 17, 1930

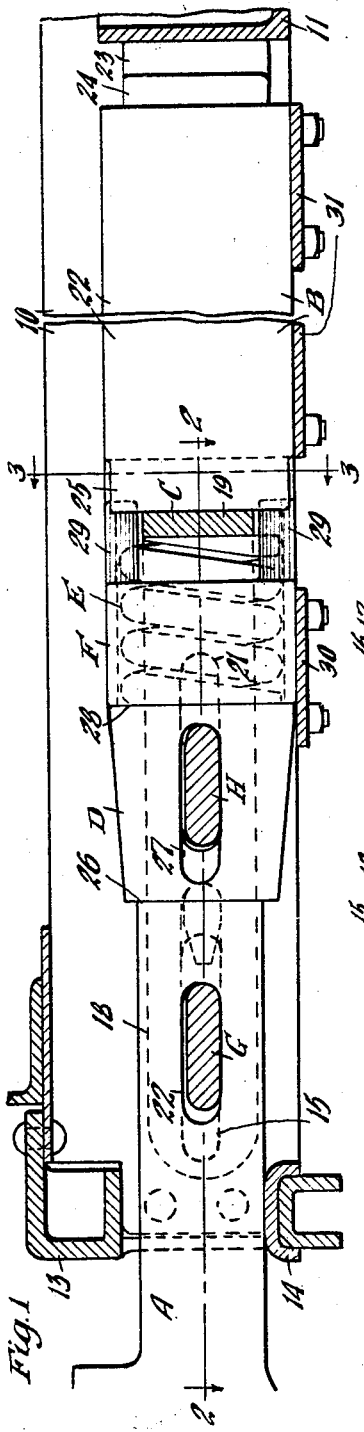

1,763,974

UNITED STATES PATENT OFFICE

EDWARD H. LEHMAN, OF CHICAGO, ILLINOIS, ASSIGNOR TO W. H. MINER, INC., OF CHICAGO, ILLINOIS, A CORPORATION OF DELAWARE

RAILWAY DRAFT RIGGING

Application filed April 9, 1928. Serial No. 268,462.

This invention relates to improvements in railway draft riggings.

It has been the general practice in the operation of railway cars, and especially freight cars, to employ draft gears having relatively short stroke in both buff and draft, the length of each stroke being approximately two and three-quarters inches. Due to the fact that there is a constant tendency in railway practice to employ cars having greater weight capacity, and also to increase the length of trains, it is becoming more and more difficult to provide the proper shock absorbing capacity in draft gears to meet these conditions, especially since up to the present time operators of railroads have not permitted any increase in the standard spacing of draft sills which would allow the use of larger draft gears. As is well known, the greatest shocks are usually encountered in buff, and it is therefore most desirable to increase the capacity of gears so that they will meet the buffing conditions.

It is one object of my invention to overcome the difficulties pointed out, by employing, in connection with the standard spaced draft sills, draft gears having great capacity, especially in buff, by providing a relatively longer buffing stroke than has been the general practice, while maintaining the draft movement the same as heretofore so that the operation in draft will not be materially changed, the increased movement during buff being provided by the combined successive action of two shock absorbing mechanisms, one of which is preferably a friction gear and the short movement in draft being provided by actuating only one of said gears.

A more specific object of my invention is to provide a draft rigging including a yoke connected to the usual coupler, wherein a shock absorbing means is disposed within the yoke and actuated in both buff and draft, being compressed through the yoke in draft and through a follower block engaged by the coupler in buff, and wherein an additional friction shock absorbing means is employed which is actuated through a pressure-transmitting member co-operating with the follower block, the pressure-transmitting member being effective to actuate the additional shock absorbing means after the shock absorbing mechanism within the yoke has been fully compressed, thereby adding the length of the compression stroke of the additional high capacity shock absorbing means to that of the shock absorbing means first actuated, to provide a relatively longer stroke in buff than in draft, with resultant high shock absorbing capacity.

A further object of the invention is to provide a draft rigging including a spring shock absorbing means and a friction shock absorbing means, together with a yoke within which the spring shock absorbing means is mounted, the yoke having a lost motion connection with the usual coupler so that the yoke will move with the coupler in draft and there will be relative movement between the coupler and yoke in buff, whereby the spring shock absorbing means is compressed in both buff and draft, wherein the friction shock absorbing means includes a friction shell and friction means co-operating therewith, the friction means being held against movement by a fixed abutment member and the friction shell being actuated through pressure-transmitting means interposed between the shell and the coupler shank, the pressure-transmitting means being normally spaced from the shell to permit a predetermined compression of the spring shock absorbing means before the friction shock absorbing means is actuated, the shell being further provided with abutment means for the inner end of the yoke to oppose inward movement of the latter while the spring shock absorbing means is being compressed.

Other and further objects of the invention will more clearly appear from the description and claims hereinafter following.

In the drawing, forming a part of this specification, Figure 1 is a vertical, longitudinal sectional view, corresponding to the center line of the car and illustrating my improvements in connection therewith. Figure 2 is a horizontal, longitudinal sectional view of the forward end portion of the mechanism illustrated in Figure 1, corresponding substantially to the line 2—2 of said figure, And Figure 3 is a transverse, vertical sectional view, corresponding substantially to the line 3—3 of Figure 1.

In said drawings, 10—10 indicate the usual draft sills, the same being spaced the standard distance apart and provided with a rear stop member in the form of the usual filler casting 11. The front wall of the filler casting 11 provides the rear stop member of the draft rigging. The sills 10 are provided with cheek plates 12—12, which are secured to the same in any suitable manner, the same being illustrated as riveted thereto. A combined striking casting and carry iron 13 is secured to the front ends of the sills 10, the casting being provided with the usual vertically disposed flanges which are fixed to the sills by means of rivets. The combined striking casting and carry iron member is provided with the usual opening which accommodates the coupler shank. As shown in Figures 1 and 2, the striking plate casting is provided with a wear plate 14, which is supported by the transversely extending bottom carry iron section of the casting and is of channel cross section, so as to interlock with the transverse carry iron section. The cheek plates 12 are provided with front and rear sets of aligned key-receiving slots 15—15 and 16—16. As shown, the cheek plates 12 are provided with reinforcing flanges forming the walls of the slots, the reinforcing flanges of each cheek plate 12 being accommodated within an elongated longitudinal opening or slot 17, formed in the corresponding draft sill 10. As clearly illustrated in Figures 1 and 2, the slots 15 are considerably longer than the slots 16. This difference in length is to provide for the proper movement of the draft gear keys to permit a longer stroke in buff than in draft.

In carrying out my invention, I employ, broadly, a coupler A; a friction shock absorbing device B; a yoke member C; a front follower block D; a spring shock absorbing means E; a pressure-transmitting casing member F; and two keys G and H.

The yoke C comprises longitudinally disposed spaced vertical side members 18—18 and a transverse rear end member 19, formed integral with the side members. The side members 18 of the yoke are provided with front and rear sets of aligned slots 20—20 and 21—21, the slots 20 being shorter than the slots 21, as clearly illustrated in Figure 2. The yoke C has a lost motion connection with the coupler A, the coupler shank being transversely slotted, as indicated at 22, to accommodate the coupler key G, which has the opposite ends thereof extending through the slots 20 of the yoke, and also the slots 15 of the cheek plates of the draft sills. As illustrated in Figure 2, the Key G substantially fits the opening in the coupler shank, there being slight play permitted between the coupler shank and the key in buff, the opening in the shank being slightly longer than the width of the key, as will appear from Figure 2. In the normal position of the parts, the front edge of the key G is in abutment with the front end walls of the slots 20 and the rear edge of said key is spaced from the rear end walls of said slots, as shown. It will be evident that upon a pulling or draft action being applied to the coupler, the yoke C will be pulled forwardly therewith through the medium of the key G. During a buffing action, that is, during inward movement of the coupler A, the key G is free to move within the slots 20, thereby permitting relative movement of the coupler and yoke until the rear edge of the key engages the rear end walls of the slots 20, whereupon the yoke will be moved in unison with the coupler.

The friction shock absorbing device B comprises a friction shell 22, and the usual co-operating friction elements, including a pair of friction shoes and a co-operating wedge member, the wedge member being designated by 23 and the shoes by 24. As shown, the friction shell is interposed between the rear end of the yoke C and the rear stop 11, the wedge member bearing directly on the stop. At the forward end, the friction shell is provided with arms 25—25 at opposite sides thereof and forwardly projecting therefrom. The arms 25 bear directly on the transverse end section 19 of the yoke. The yoke is thus held against inward movement during the first part of the compression stroke of the mechanism until the frictional resistance between the friction system and the shell is overcome, whereupon the yoke and shell move rearwardly in unison.

The follower block D has a flat front end face 26, which bears directly on the inner end of the shank of the coupler A. The block D is interposed between the side members of the yoke C and is transversely slotted, as indicated at 27, to accommodate the key H. As shown, the slot 27 is of greater length than the width of the key, thereby permitting a certain amount of relative movement between the follower block and key. The key H has the opposite ends thereof extending through the slots 21 of the yoke C and also through the slots 16 of the cheek plates. As most clearly shown in Figure 1, the follower block is tapered and has a flat rear end face 28 which co-operates with the pressure-transmitting casing F, as hereinafter more clearly pointed out.

The spring resistance E is in the form of a single coil, which is interposed between the flat abutment face 28 of the follower block D and the transverse end section 19 of the yoke. The spring is normally under initial compression and maintains the key H in the position shown in Figures 1 and 2, with the front edge of the key in engagement with the front end walls of the slots 16 of the cheek plates. In this position of the parts, the follower block D is in its outermost position, with the rear end wall of the slot 27 thereof in engagement with the rear edge of the key H and the front end face 26 in engagement with the coupler shank, thereby holding the coupler key G engaged with the front end walls of the slots 20 of the yoke.

The pressure-transmitting casing, which is in the form of a rectangular box-like member, open at the opposite ends, is also disposed within the yoke and has the front end thereof bearing on the rear end face 28 of the follower block D. The top and bottom walls of the casing F are rearwardly extended to provide arms 29—29, which are spaced apart vertically such a distance as to accommodate the end section 19 of the yoke therebetween. The arms 29, as most clearly shown in Figure 3, engage between the side arms 25 of the friction shell 22. The adjacent edges of the arms 25 and 29 are cut away, as shown, to provide inner fitting beveled members. The rear ends of the arms 29 are spaced from the front end of the friction shell proper, as clearly shown in Figures 1 and 2, and the rear end portions of the side walls of the casing F are spaced a corresponding distance from the transverse end section 19 of the yoke. It will be seen that the friction shell 22 and the pressure-transmitting casing F are thus inter-connected for sliding movement, so as to maintain the same in proper longitudinal alignment.

In order to maintain the parts in proper position and support the same, saddle plates 30 and 31 are provided. The saddle plate 30 supports the pressure-transmitting casing directly and is secured to the bottom flanges of the draft sills in any suitable manner, the same in this instance being shown as secured by bolts. The plate 31 is elongated and serves to support the friction shell 22 of the friction shock absorbing mechanism. As illustrated in Figure 1, the plate 31 is preferably of substantially the same length as the friction shell proper. This plate is also secured to the bottom flanges of the draft sills in any suitable manner and is herein shown as secured by bolts.

The operation of my improved railway draft rigging, assuming a compression or buffing action being applied to the coupler A, is as follows: The coupler A will be forced inwardly, carrying the follower block D therewith, thereby compressing the spring resistance E against the end section 19 of the yoke. During the first part of the buffing action, the yoke will be held substantially stationary by engagement with the friction shell 22, the wedge member of the friction system of which is in engagement with the rear stop 11 of the railway draft rigging. The combined resistance of the friction means and the spring within the friction shell is such that there will be substantially no relative movement between the friction system and the friction shell during the time that the spring resistance E is being compressed. During the continued inward movement of the coupler and the follower block D, the pressure-transmitting casing F will be forced rearwardly with respect to the yoke C, until the rear ends of the arms 29 engage the friction shell 22, thereby forcing the friction shell rearwardly in unison with the coupler and follower block D. The parts are preferably so proportioned that the inner end portions of the side walls of the pressure-transmitting casing F will also engage the transverse section 19 of the yoke when the arms 29 engage the friction shell 22. The pressure will thus be transmitted also through the casing F, the transverse end section 19 of the yoke, to the side arms 25 of the shell 22, to force the latter rearwardly. The friction shell 22 will thus be forced rearwardly with respect to the friction system during the remaining portion of the buffing stroke of the mechanism, until movement of the parts is positively arrested by the rear end of the friction shell engaging the rear stop member 11.

Upon the actuating pressure being reduced, the expansive action of the spring resistance E will restore the follower block D to its outward position with respect to the yoke C, and the yoke and parts carried thereby will be returned to their outermost position by the expansive action of the friction shock absorbing mechanism B which carries the friction shell 22 forwardly to the position illustrated in Figures 1 and 2. In this connection, it is pointed out that the slots 21 and 16 of the yoke and the cheek plates of the draft sills are of such a length as to permit the full compression stroke of the mechanism in buff. The length of these slots is equal to or greater than the combined movement of the friction shell and the pressure-transmitting casing F. When the parts have reached their normal position, the coupler key G is spaced from both ends of the slots 15 of the cheek plates and is in engagement with the front end walls of the slots 20 of the yoke. Inasmuch as the coupler key is spaced from the end walls of the slots 15, a certain amount of movement of the coupler is permitted in draft, but the follower block D is held against movement during this action because the key H is held against forward movement by the front end walls of the slots 16.

Assuming a draft action being applied to the mechanism, the coupler A will be pulled forwardly, thereby pulling the yoke C forwardly therewith. During the forward movement of the yoke, the spring resistance E will be compressed between the same and the follower block D. This action will continue until the transverse end section 19 of the yoke is limited in its forward movement by engagement with the rear end portions of the side walls of the pressure-transmitting casing F, which is held against forward movement by the follower block D. Inasmuch as the arms 29 of the pressure-transmitting casing F have sliding engagement with the arms 25 of the friction shell 22, there will be no forward movement of the friction shell during the draft action just described. It will be evident that there is thus provided a relatively shorter stroke of the mechanism in draft than in buff, during which only the spring resistance will be compressed. The parts are all restored to their normal position, as shown in Figures 1 and 2, by the expansive action of the spring resistance E.

From the preceding description, taken in connection with the drawings, it will be evident that I have provided a railway draft rigging having a relatively long stroke in buff, whereby high capacity is obtained, and a relatively shorter stroke in draft, during which only spring resistance is had, the parts of the mechanism being so designed that the same are always maintained in proper longitudinal alignment and there is no danger of the parts becoming accidentally separated or displaced.

While I have herein shown and described what I consider the preferred manner of carrying out my invention, the same is merely illustrative and I contemplate all changes and modifications which come within the scope of the claims appended hereto.

I claim:

1. In a draft rigging for railway cars, the combination with spaced draft sills and a rear stop member fixed with respect to said sills; of a coupler; a yoke having a lost motion connection with the coupler; a friction shock absorbing mechanism interposed between the yoke and the rear stop member; spring shock absorbing means within the yoke, adapted to be compressed upon inward movement of the coupler with respect to the yoke; a pressure-transmitting member movable inwardly with respect to the yoke and normally spaced from said friction shock absorbing mechanism, said pressure-transmitting member being movable inwardly with the coupler and adapted to actuate said friction shock absorbing mechanism after a predetermined compression of the spring shock absorbing mechanism.

2. In a draft rigging for railway cars, the combination with spaced draft sills; of a rear stop member fixed with respect to said sills; a coupler; a yoke having a lost motion connection with said coupler, said yoke being movable in unison with the coupler in draft, and said coupler and yoke being relatively movable in buff; spring shock absorbing means within the yoke, said spring shock absorbing means being interposed between the inner end of the yoke and coupler; and additional shock absorbing means interposed between the yoke and rear stop, said additional shock absorbing means including a friction shell and co-operating friction means including an actuating member co-operating with said rear stop, said friction shell bearing on the inner end of the yoke; a pressure-transmitting member movable with said coupler and also movable relatively to the yoke in buff and having means thereon normally spaced from the friction shell, adapted to engage the latter after a predetermined compression of said spring shock absorbing means to effect movement of the shell in compression of the friction shock absorbing means.

3. In a draft rigging for railway cars, the combination with spaced draft sills; of a rear stop member; a coupler; a yoke keyed to the coupler, thereby providing a lost motion connection with said coupler, said yoke being movable in unison with the coupler during draft and said coupler and yoke being relatively movable in buff; a spring shock absorbing means within the yoke; a follower block interposed between the inner end of the coupler shank and the spring shock absorbing means, said follower block having a key connection with the yoke and draft sills, and being relatively movable to said key during buff; a friction shock absorbing means interposed between the yoke and said rear stop, said friction shock absorbing means including a friction shell engaging the inner end of the yoke; and a pressure-transmitting casing interposed between the follower block and the friction shell, said casing being movable with respect to the yoke in buff and having arms rearwardly extending therefrom and normally spaced from the friction shell and adapted to engage the latter after a predetermined compression of the spring shock absorbing means to effect compression of the friction shock absorbing means during the remainder of the compression stroke.

4. In a railway draft rigging, the combination with spaced draft sills; of a rear stop member fixed with respect to the sills; yoke means operating between the sills; a friction shock absorbing means interposed between the inner end of the yoke means and the rear stop; a coupler; a key member connecting the coupler to the yoke to permit relative movement between the coupler and yoke during buff, and compel movement of the yoke with the coupler in draft; a spring resistance within the yoke; a follower block interposed between the rear end of the coupler shank and the spring resistance; a key extending through the follower block and through aligned openings in the yoke and draft sills, said key being limited in its forward movement by engagement with the front end walls of the openings in the sills, and said follower block being limited in its forward movement by engagement with said key; and a pressure-transmitting casing enclosing the spring resistance and bearing on the inner end of the follower block, said casing being provided with rearwardly extending arms co-operating with the friction shell and normally spaced therefrom to permit a certain amount of relative movement between the casing and friction shell during the first part of the compression stroke of the mechanism.

5. In a railway draft rigging, the combination with draft sills and a fixed rear stop member; of a coupler; a yoke movable outwardly with said coupler, said coupler being movable inwardly with respect to the yoke; a friction shock absorbing mechanism interposed between the inner end of the yoke and the rear stop member, said friction shock absorbing mechanism including a friction shell having forwardly extending arms bearing directly on the inner end of the yoke; a spring resistance within the yoke; a follower block interposed between the inner end of the shank of the coupler and the spring resistance; and a pressure-transmitting casing having rearwardly extending top and bottom arms slidable between the forwardly extending arms of the friction shell and having their inner ends normally spaced from the friction shell proper to permit a certain amount of compression of the spring resistance before the friction shell is engaged and actuated by said arms.

6. In a draft rigging, the combination with draft sills; of front and rear stop-acting means; a front follower; a main friction shock absorbing device including a shell; means having limited movement with respect to the shell for transmitting the buffing forces from said follower to the shell; a yoke adapted to be connected to a coupler; a secondary shock absorbing device of relatively short stroke interposed between said follower and the rear end of the yoke; and means for limiting the draft movement of the coupler to an amount less than the buff movement thereof.

7. In a draft rigging for railway cars, including center sills, the combination with a yoke; of a rear stop member; a shock absorbing means between said sills and interposed between the inner end of the yoke and said stop member held against inward movement by said stop member; a pressure-transmitting member adapted to transmit the actuating force to said shock absorbing means during buff; a second shock absorbing means within the yoke; front follower means cooperating with said second-named shock absorbing means and bearing on said pressure-transmitting member; means for holding said follower against outward movement; a coupler having a lost motion connection with said yoke means, to effect outward movement of the yoke in unison with said coupler and permit inward movement of the coupler with respect to the yoke to effect compression of said second-named shock absorbing means, said coupler engaging the front follower in buff to actuate the same and said pressure transmitting member, the latter being active after a predetermined compression of the second-named shock absorbing means to compress said first-named shock absorbing means.

8. In a shock absorbing mechanism, the combination with means receiving the actuating force in both buff and draft; of a yoke element having a lost motion connection with said means, permitting limited movement inward of said means with respect to the yoke in buff; a shock absorber opposing relative movement of said means and yoke; a pressure-transmitting member directly actuated by said means in buff, said pressure-transmitting member having limited movement with respect to the yoke to an extent less than the full buffing stroke of the mechanism, the relative movement of said member and yoke being positively arrested after a predetermined compression of the mechanism; a rear stop member and additional shock absorbing means interposed between the inner end of the yoke and the rear stop member and engaged and actuated by said pressure-transmitting member during a buffing stroke only of the mechanism.

In witness that I claim the foregoing I have hereunto subscribed my name this 6th day of April, 1928.

EDWARD H. LEHMAN.